(12) United States Patent
Chung

(10) Patent No.: US 9,223,498 B2
(45) Date of Patent: Dec. 29, 2015

(54) METHOD FOR SETTING AND METHOD FOR DETECTING VIRTUAL KEY OF TOUCH PANEL

(75) Inventor: Chao-Hsiang Chung, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 260 days.

(21) Appl. No.: 13/438,929

(22) Filed: Apr. 4, 2012

(65) Prior Publication Data

US 2013/0113724 A1    May 9, 2013

(30) Foreign Application Priority Data

Nov. 9, 2011  (TW) .............................. 100140947 A

(51) Int. Cl.
*G06F 3/041* (2006.01)
*G06F 3/0488* (2013.01)
*G06F 3/0486* (2013.01)

(52) U.S. Cl.
CPC .......... *G06F 3/04886* (2013.01); *G06F 3/0486* (2013.01)

(58) Field of Classification Search
CPC . G06F 3/0486; G06F 3/04886; G06F 3/0484; G06F 3/04845; G06F 3/04842; G06F 3/0482; G06F 3/04817; G06F 3/0481; G06F 3/0488; G06F 3/048
USPC .......... 345/172, 173; 715/762, 763, 773, 863; 178/18.01–18.11
See application file for complete search history.

(56) References Cited

U.S. PATENT DOCUMENTS

| 5,936,614 | A * | 8/1999 | An et al. ........................ 345/173 |
| 7,266,777 | B2 * | 9/2007 | Scott et al. ............. G08C 17/02 348/734 |
| 7,844,914 | B2 * | 11/2010 | Andre et al. ................... 715/773 |
| 2010/0020031 | A1 * | 1/2010 | Hwang et al. ................. 345/173 |
| 2010/0033504 | A1 * | 2/2010 | Hart et al. ..................... 345/660 |
| 2010/0169813 | A1 | 7/2010 | Chang |
| 2010/0333033 | A1 * | 12/2010 | Wu et al. ....................... 715/835 |
| 2011/0181603 | A1 * | 7/2011 | Liang et al. ................... 345/473 |
| 2012/0044164 | A1 * | 2/2012 | Kim et al. ..................... 345/173 |
| 2012/0066595 | A1 * | 3/2012 | Sung et al. .................... 715/716 |

FOREIGN PATENT DOCUMENTS

TW    201025111 A    7/2010
TW    201128474 A    8/2011

OTHER PUBLICATIONS

TW Office Action dated Dec. 25, 2013.
English translation of TW Office Action dated Dec. 25, 2013.
English translation of TW201128474 (Published Aug. 16, 2011.
TW Office Action dated Mar. 26, 2014.
Partial translation of TW Office Action dated Mar. 26, 2014.

* cited by examiner

*Primary Examiner* — Lun-Yi Lao
*Assistant Examiner* — Elliott Deaderick
(74) *Attorney, Agent, or Firm* — McClure, Qualey & Rodack, LLP

(57) ABSTRACT

A method for setting and a method for detecting a virtual key of a touch panel are provided. The method for setting the virtual key of the touch panel includes the following steps. A setting interface is provided. A key function is received via the setting interface by a processor. A key area is received via the setting interface by the processor. The key function and the key area are stored in a register. The register corresponds to the virtual key.

3 Claims, 5 Drawing Sheets

METHOD FOR SETTING AND METHOD FOR DETECTING VIRTUAL KEY OF TOUCH PANEL

This application claims the benefit of Taiwan application Serial No. 100140947, filed Nov. 9, 2011, the subject matter of which is incorporated herein by reference.

BACKGROUND OF THE INVENTION

1. Field of the Invention

The invention relates in general to a method for setting and a method for detecting a touch panel, and more particularly to a method for setting and a method for detecting a virtual key of a touch panel.

2. Description of the Related Art

Diversified innovated electronic apparatuses are launched to the market along with continuous thriving of technology. Among various technology developments, a touch panel is rather an important milestone. The touch panel is capable of displaying images and allows command inputs though a touch method. Further, the input approach of the touch panel, being quite intuitive, on top of being capable of replacing a keyboard and a mouse, also creates numerous technology applications. For example, the touch panel may serve as a graphic board, a write pad or an information query machine.

The number of electronic apparatuses equipped with the touch panel is ever-increasing to extend into many different novel applications. In different applications, a screen of the touch panel displays different keys for a user to select from and thus to input a command. However, a built-in key does not always meet user requirements. An excessively large amount of keys may also shield a foreground image on the screen to cause utilization complications. Therefore, there is a need for a solution that provides more user-friendly operations for the touch panel.

SUMMARY OF THE INVENTION

The invention is directed to a method for setting and a method for detecting a virtual key of a touch panel. Through the method for setting the virtual key, a user may freely define a key function and a key area of the virtual key to adapt to different specific needs. Further, in the corresponding method for detecting the virtual key, the completeness of a foreground image is maintained in contribution to a hidden design of the virtual key.

According to an aspect the present invention, a method for setting a virtual key of a touch panel is provided. The method includes providing a setting interface, receiving a key function via the setting interface by a processor, receiving a key area via the setting interface by the processor, and storing the key function and the key area to a register. The register corresponds to the virtual key.

According to another aspect of the present invention, a method for detecting a virtual key of a touch panel is provided. The method includes: providing a virtual key, the virtual key having a key function and a key area and being hidden under a foreground image; by a detector, detecting whether the touch panel is pressed; if the touch panel is pressed, determining whether a pressed position of the touch panel falls in the key area by a processor; if the pressed position of the touch panel is located in the key area, performing the key function by the processor when the key area is pressed or released.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
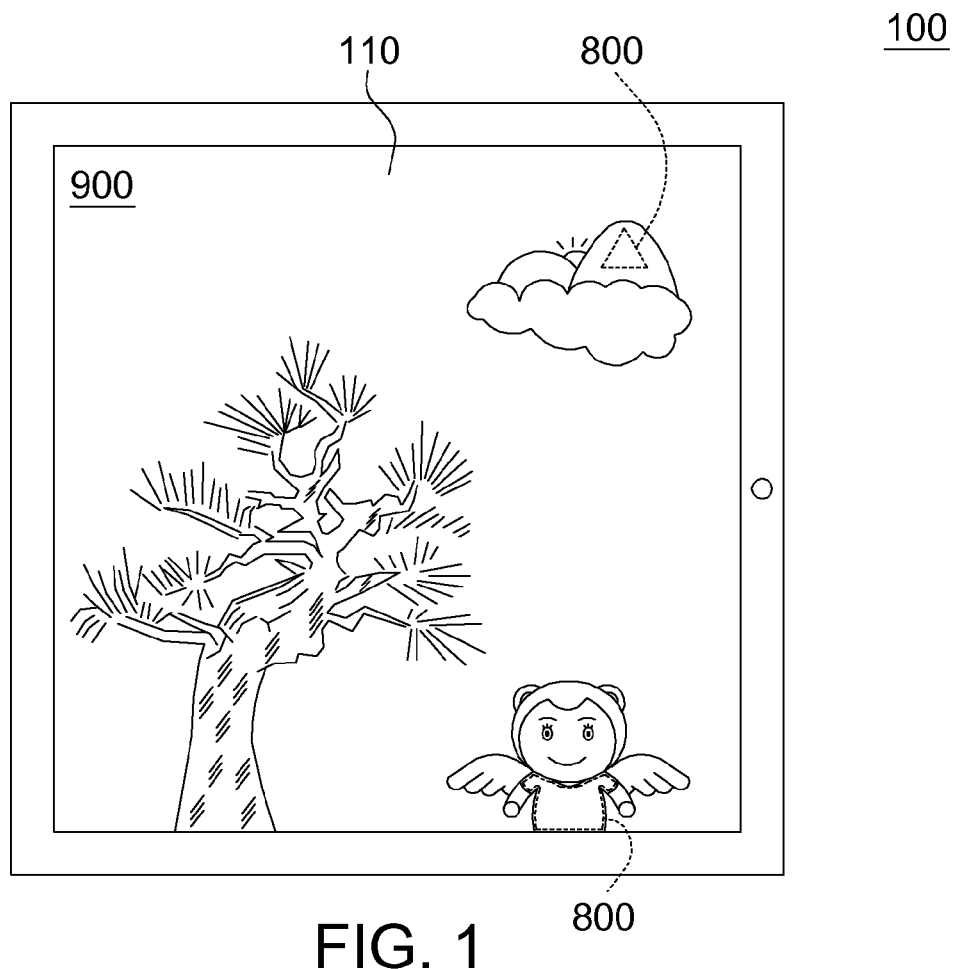
FIG. 1 is a schematic diagram of a virtual key according to an embodiment.

FIG. 1 shows a schematic diagram of a virtual key 800 according to an embodiment of the present invention. The virtual key 800 is hidden under a foreground image 900, and is represented in dotted lines. For example, the foreground image 900 is a calendar image, a game image, an email image or a photograph. Since the virtual key 800 is hidden under the foreground image 900, a user only perceives the foreground image 900 but not the virtual key 800. When a key area defined by the virtual key 800 is pressed, an electronic apparatus 100 performs a corresponding key function.

Since the virtual key 800 is hidden under the foreground image 900 as previously stated, the completeness of the foreground image 900 is unaffected. More particularly, when a large key area is desired, not only an original size of the foreground image 900 can be maintained but also the foreground image 900 is not shielded by virtual key 800.

When a user needs to learn the key area and the key function of the virtual key 800, the electronic apparatus 100 may inform the user of the required information through a text or audio approach. Thus, the completeness of the foreground image 900 is maintained while the user may also be guided to press the virtual key 800.

Further, the key area of the virtual key 800 may be user-defined as desired. For example, when the foreground image 900 is a mountain, a triangular area at a top of the mountain may be defined as the key area. By selecting the top of the mountain, the corresponding key function may be performed. For example, when the foreground image 900 is a cartoon character, an irregular area of the cartoon character's clothing may be defined as the key area, and a corresponding key function may be performed by selecting the clothing.

Figure 2:
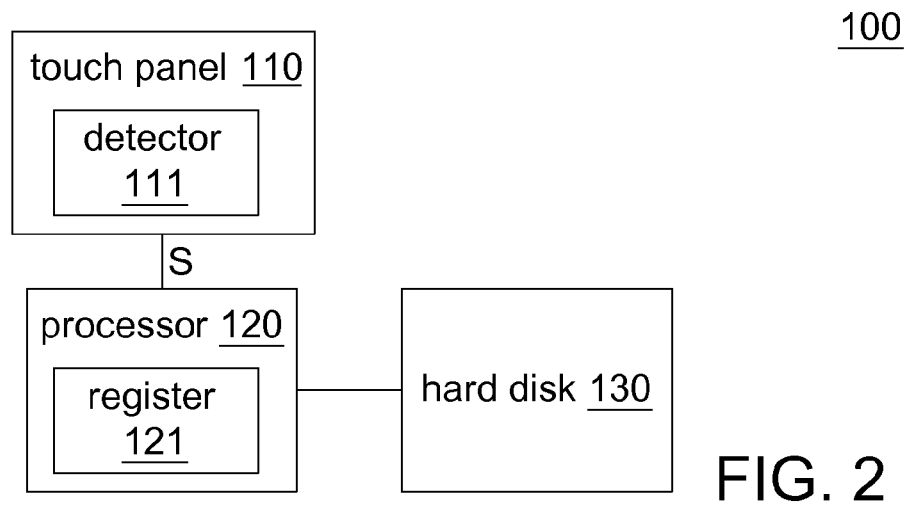
FIG. 2 is a schematic diagram of an electronic apparatus according to an embodiment.

FIG. 2 shows a schematic diagram of an electronic apparatus 100 according to an embodiment of the present invention. For example, the electronic apparatus 100 is a tablet computer, smart phone or a notebook computer. The electronic apparatus 100 includes a touch panel 110, a processor 120 and a hard disk 130. For example, the touch panel 110 is a capacitive touch panel or a resistive touch panel, and a detector 111 is a combination of a transparent conductive array and a chip. The processor 120 performs various determination procedures and processing procedures. A register 121 temporarily stores data during a processing procedure of the processor 120. The hard disk 130 stores processed data. In this embodiment, the virtual key 800 (shown in FIG. 1) is detected and set by the processor 120. The method for setting and the method for detecting the virtual key (shown in FIG. 1) shall be described below.

Figure 3:
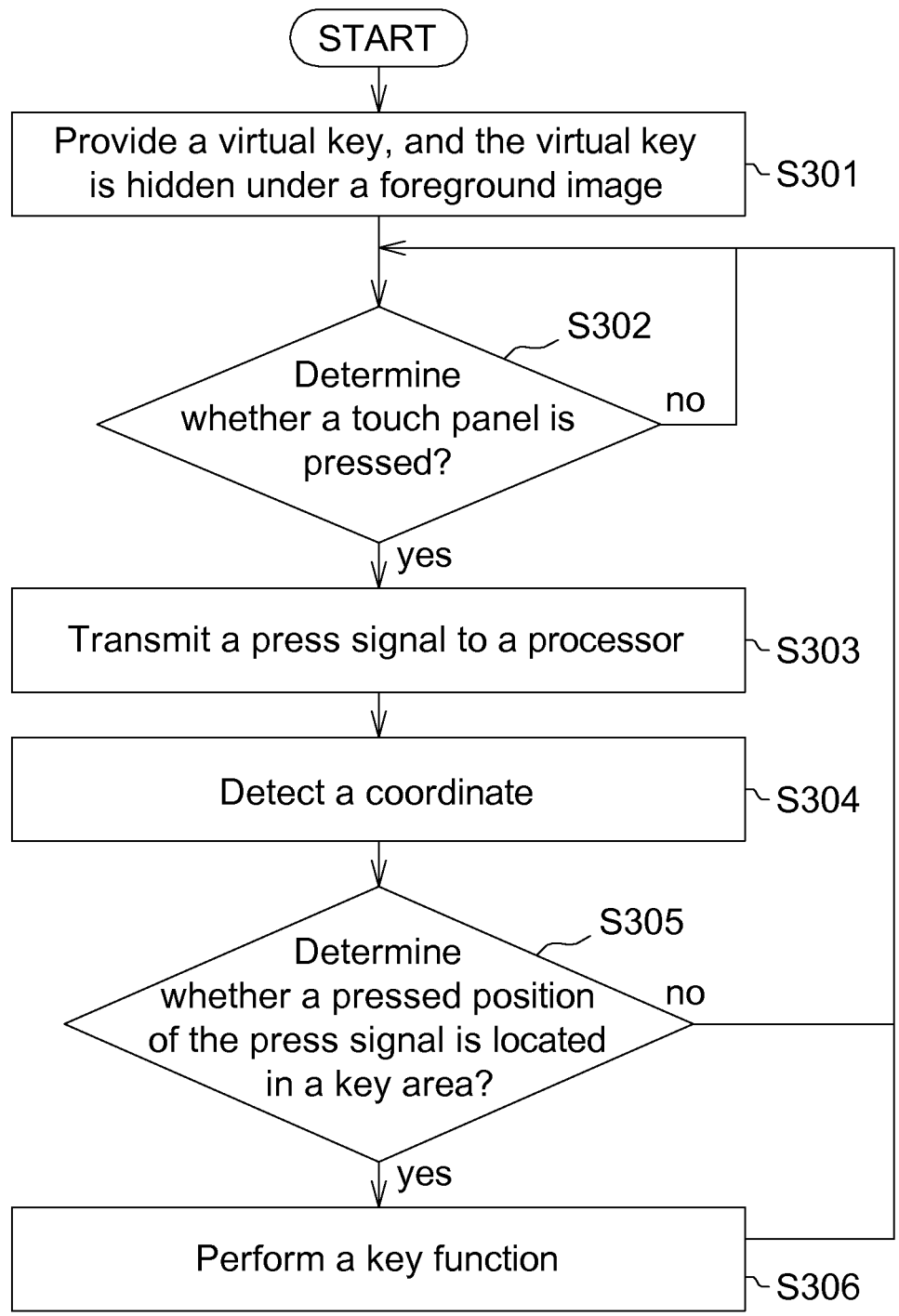
FIG. 3 is a flowchart of a method for detecting a virtual key according to an embodiment.

Please referring to FIGS. 1 to 3, FIG. 3 shows a flowchart of a method for detecting a virtual key 800 according to an embodiment of the present invention. In step S301, the virtual key 800 is provided. The virtual key 800 includes a key function and a key area, and is hidden under a foreground image 900. A user only perceives the foreground image 900 but not the virtual key 800.

In step S302, the detector 111 detects whether the touch panel 110 is pressed. If the touch panel 110 is pressed, step S303 is performed; or else the process returns to step S302.

In step S303, a press signal S is transmitted to the processor 120. The press signal S indicates that the touch panel 110 is pressed.

In step S304, the processor 120 detects a coordinate according to the press signal S.

In step S305, the processor 120 determines whether a pressed position of the touch panel 110 is located in the key area. If the pressed position of the touch panel 110 is located in the key area, step S306 is performed; or else process returns to step S302.

In step S306, when the key area is pressed or released, the processor 120 performs the key function.

Through the above detection method, under a normal display of the foreground image 900, a user is allowed to press the virtual key 800 in the key area and thus execute the corresponding key function. It should be noted that the virtual key 800 does not affect the display of the foreground image 900.

In the above hidden virtual key 800, the key area includes a position information and a shape information. A user may define the key area by setting the position information and the shape information according to the approach below. Further, a user is also allowed to define the corresponding key function.

Figure 4:
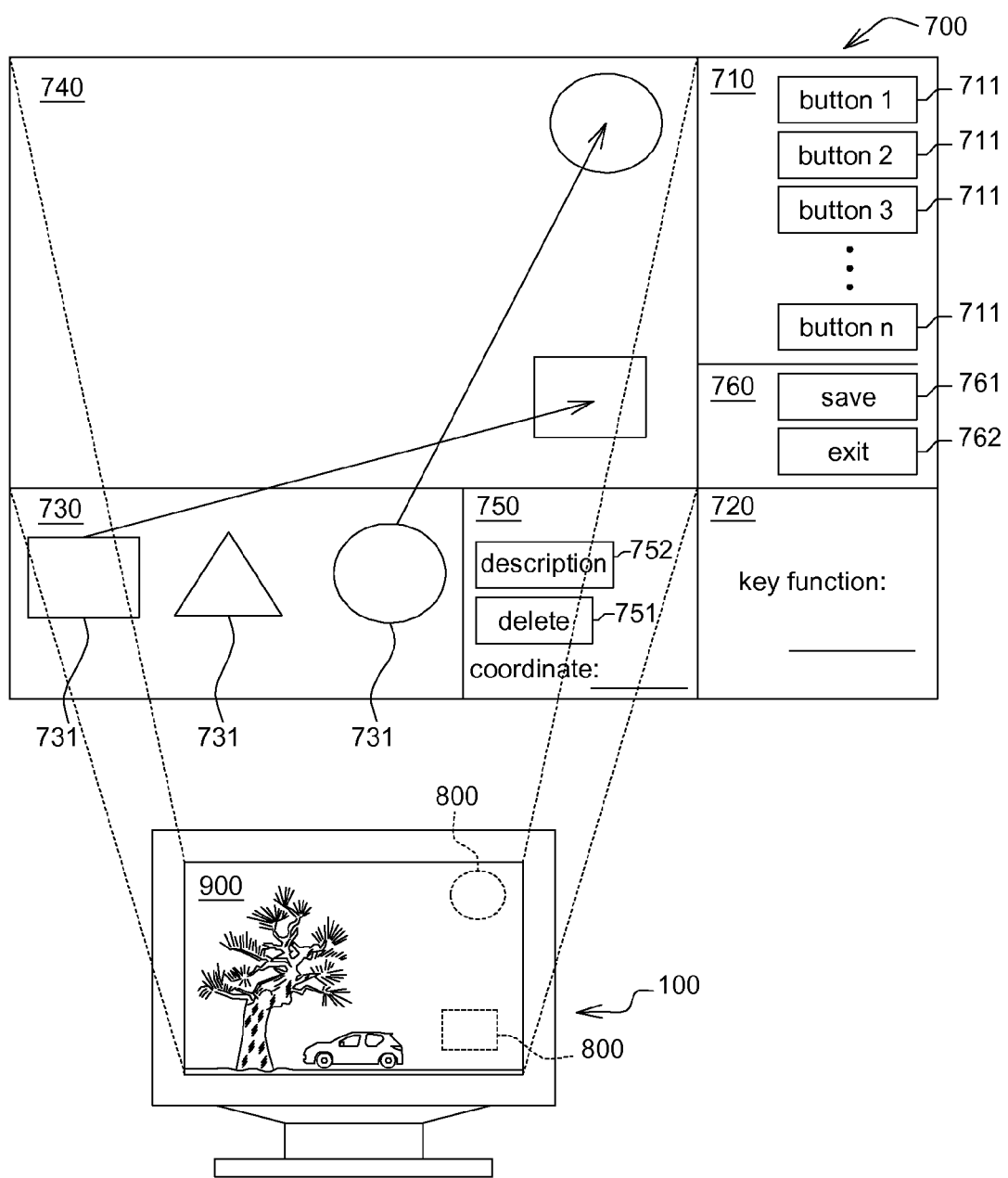
FIG. 4 is a schematic diagram of a setting interface according to an embodiment.
Figure 5A:
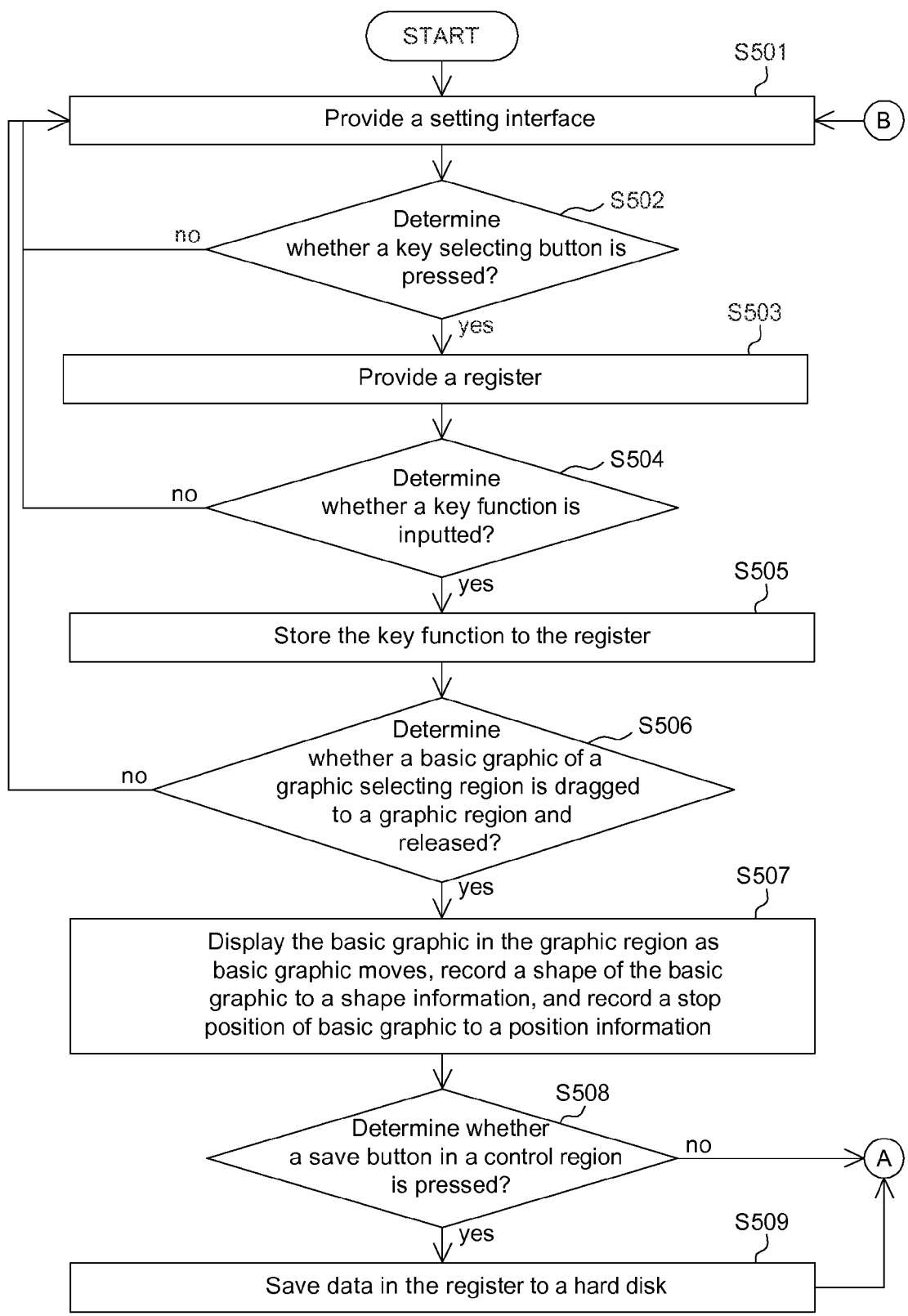
FIGS. 5A and 5B are flowcharts of a method for setting a virtual key according to an embodiment.
Figure 5B:
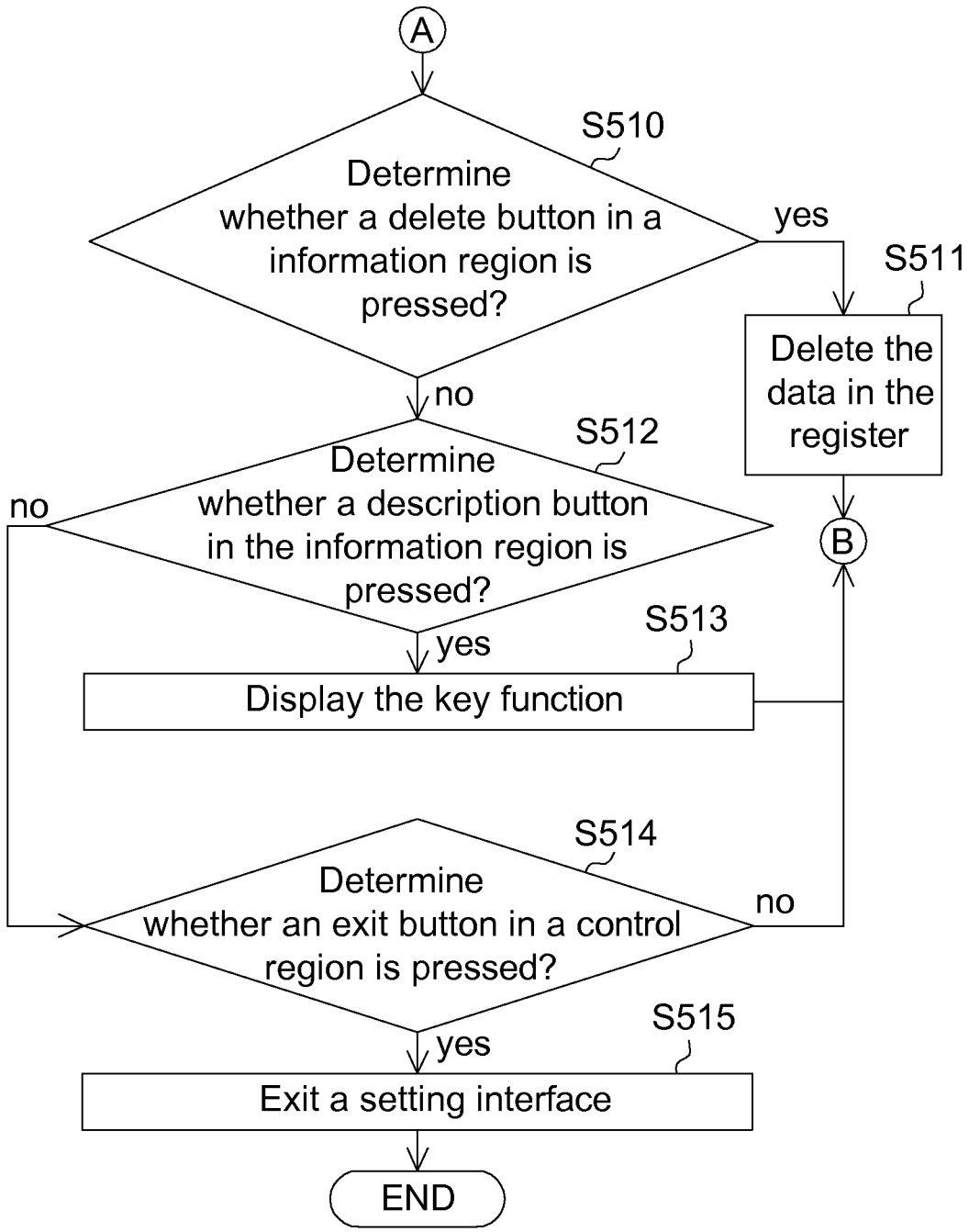

FIG. 4 shows a schematic diagram of a setting interface 700, and FIGS. 5A and 5B show flowcharts of a method for setting a virtual key 800 according to an embodiment. In step S501, the setting interface 700 is provided. The setting interface 700 includes a key selecting region 710, a function input region 720, a graphic selecting region 730, a graphic region 740, an information region 750 and a control region 760. The key selecting region 710 provides a plurality of key selecting buttons 711 for a user to select a virtual key 800 to be set. The function input region 720 is for inputting the key function. The graphic region 730 provides a plurality of basic graphics 731 for a user to set the shape information of the virtual key 800. The graphic region 740 is for a user to set the position information of the virtual key 800. The information region 750 displays information associated with the virtual key 800, or is for deleting information associated with the virtual key 800. The control region 760 is for storing or exiting the setting interface 700.

In step S502, the processor 120 determines whether any of the key selecting buttons 711 is selected. Step S503 is performed when one of the key selecting buttons 711 is selected, or else the process returns to step S501 when no key selecting button 711 is selected.

In step S503, the register 121 corresponding to the virtual key 800 is provided.

In step S504, the processor 120 determines whether a key function is inputted to the function input region 720. If key function is inputted, step S505 is performed; or else the process returns to step S501.

In step S505, the processor 120 stores the key function to the register 121.

In steps S506 and S507, the processor 120 receives the key area. Steps S506 and S507 respectively set the shape information and the position information.

In step S506, the processor 120 detects whether one of the basic graphics 731 in the graphic selecting region 730 is dragged to the graphic region 740 and then released. The process returns to step S501 if no basic graphic 731 is dragged to the graphic region 740.

In step S507, the processor 120 displays the basic graphic 731 in the graphic region 740 as the basic graphic 731 moves. The processor 120 further records a shape of the dragged basic graphic 731 to the shape information in the register 121, and records a stop position of the dragged basic graphic 731 to the position information in the register 121. A coordinate system of the graphic region 740 is directly proportional to a coordinate system of the touch panel 110. The processor 120 may calculate the position information corresponding to the touch panel 110 according to the stop position in the graphic region 740.

In step S508, the processor 120 determines whether a save button 761 in the control region 760 is pressed. If the save button 761 is pressed, step S509 is performed; or else step S510 is performed.

In step S509, the processor 120 stores the data in the register 121 to the hard disk 130.

In step S510, the processor 120 determines whether a delete button 751 in the information region 750 is pressed. Step S511 is performed when the delete button 751 is pressed, or else step S512 is performed when the delete button 751 is not pressed.

In step S511, the processor 120 deletes the data in the register 121. The process returns to step S501 after step S511.

In step S512, the processor 120 determines whether a description button 752 is pressed. If the description button 752 is pressed, step S513 is performed; or else step S514 is performed.

In step S513, the processor 120 displays the key function in the information region 750. The process returns to step S501 after step S513.

In step S514, the processor 120 determines whether an exit button 762 in the control region 760 is pressed. If the exit button 762 is pressed, step S515 is performed; or else the process returns to step S501.

In step S515, the processor 120 turns off the setting interface 700.

Through the process above, a user is allowed to define the virtual key 800 as desired based on different requirements. In an embodiment, between the determination steps is a predetermined period, and a no-action is determined when no response is received after the predetermined period. Further, an order of performing the steps is not to that described above. For example, the orders of steps S503 and S504 for setting the key function, steps S506 and S507 for setting the key area, steps S508 and S509 for storing the information, steps S510 and S511 for deleting the information, and steps S512 and S513 for describing the information may be interchanged. It should be noted that the details of the embodiments are for illustrative purposes only rather than limiting the scope of the present invention.

Therefore, through the method for setting the virtual key 800, a user may freely define the key function and the key area of the virtual key 800 to adapt to different specific needs. Further, in the corresponding method for detecting the virtual key 800, the completeness of the foreground image 900 is maintained in contribution to hide the virtual key 800.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for setting a virtual key of a touch panel, comprising:
    providing a setting interface;
    providing a register when a key selecting button is pressed;
    storing a key function in the register when the key function is inputted;
    displaying a basic graphic in a graphic region and recording both a shape of the basic graphic to a shape information and a stop position of the basic graphic when the basic graphic is dragged from a graphic selecting region to the graphic region and released; and
    saving the shape information and the stop position in the register when a save button in a control region is pressed;
    wherein the setting interface comprises a position display region for displaying coordinate data of the stop position.

2. The method according to claim 1, wherein a coordinate system of the graphic region is directly proportional to that of the touch panel.

3. The method according to claim 1, wherein the setting interface further comprises a function input region for inputting the key function.

* * * * *